United States Patent [19]
Thompson et al.

[11] Patent Number: 5,825,755
[45] Date of Patent: Oct. 20, 1998

[54] METHOD AND APPARATUS FOR SWITCHING BETWEEN FULL-DUPLEX AND HALF-DUPLEX CSMA/CD SYSTEMS

[75] Inventors: Geoffrey O. Thompson, Palo Alto; Paul Woodruff, Sunnyvale, both of Calif.

[73] Assignee: Bay Networks, Inc., Santa Clara, Calif.

[21] Appl. No.: 376,125

[22] Filed: Jan. 19, 1995

Related U.S. Application Data

[63] Continuation-in-part of Ser. No. 288,963, Aug. 10, 1994, Pat. No. 5,726,976.

[51] Int. Cl.$^6$ .................................................. H04L 12/413
[52] U.S. Cl. .......................................... 370/296; 370/445
[58] Field of Search .......................... 370/79, 85.1, 85.2, 370/85.3, 93, 94.3, 24, 31, 276, 278, 282, 296, 445, 446, 279; 340/825.03, 825.5, 825.51, 825.06, 825.07; 371/37.01, 37.7

[56] References Cited

U.S. PATENT DOCUMENTS

| | | | |
|---|---|---|---|
| 4,531,238 | 7/1985 | Rawson et al. | 370/85.3 |
| 4,630,288 | 12/1986 | Longstaff et al. | |
| 4,759,018 | 7/1988 | Buchner | |
| 4,920,533 | 4/1990 | Dufresne et al. | |
| 5,012,467 | 4/1991 | Crane | |
| 5,119,372 | 6/1992 | Verbeek | |
| 5,121,382 | 6/1992 | Yang et al. | |
| 5,249,183 | 9/1993 | Wong et al. | |
| 5,351,241 | 9/1994 | Yehonatan | 370/85.3 |
| 5,432,775 | 7/1995 | Crayford | 370/10 |
| 5,504,738 | 4/1996 | Sambamurthy et al. | 370/85.3 |
| 5,541,964 | 7/1996 | Cohen et al. | 375/285 |
| 5,572,511 | 11/1996 | Ouyang et al. | 370/13 |

OTHER PUBLICATIONS

ANS/IEEE Standard 802.3, 1993 Edition, Abstract and Table of Contents.

Thomas W. Madron, "LANS Applications of IEEE/ANSI 802 Standards," 1989, pp. 15–45 and 60–63.

Martin dePrycker,"Asynchronous Transfer Mode Solution for Broadband ISDN," 1992, Table of Contents.

*Primary Examiner*—Chau Nguyen
*Attorney, Agent, or Firm*—Blakely Sokoloff Taylor & Zafman, LLP

[57] ABSTRACT

A method and apparatus for a node to automatically switch between half-duplex and full-duplex transmission in CSMA/CD networks characterized by a first and second device coupled over a communication link to allow communication of information and control signals between the first and second device. Each of the two devices include a transmit circuit and a receive circuit, wherein the first device begins to transmit information on a first communication circuit, the first communication circuit providing for communication of information between the first device and the second device, and the second device receives the transmitted information. If, while the first device is transmitting information to the second device, the second device begins to transmit information on a second communication circuit, the second communication circuit providing for communication of information between the second device and the first device, and the first device receives the transmitted information, full-duplex communication therebetween is established. If, while the first device is transmitting information to the second device, the second device transmits a collision detect signal and the first device receives the collision detect signal, half-duplex communication therebetween is subsequently established.

27 Claims, 8 Drawing Sheets

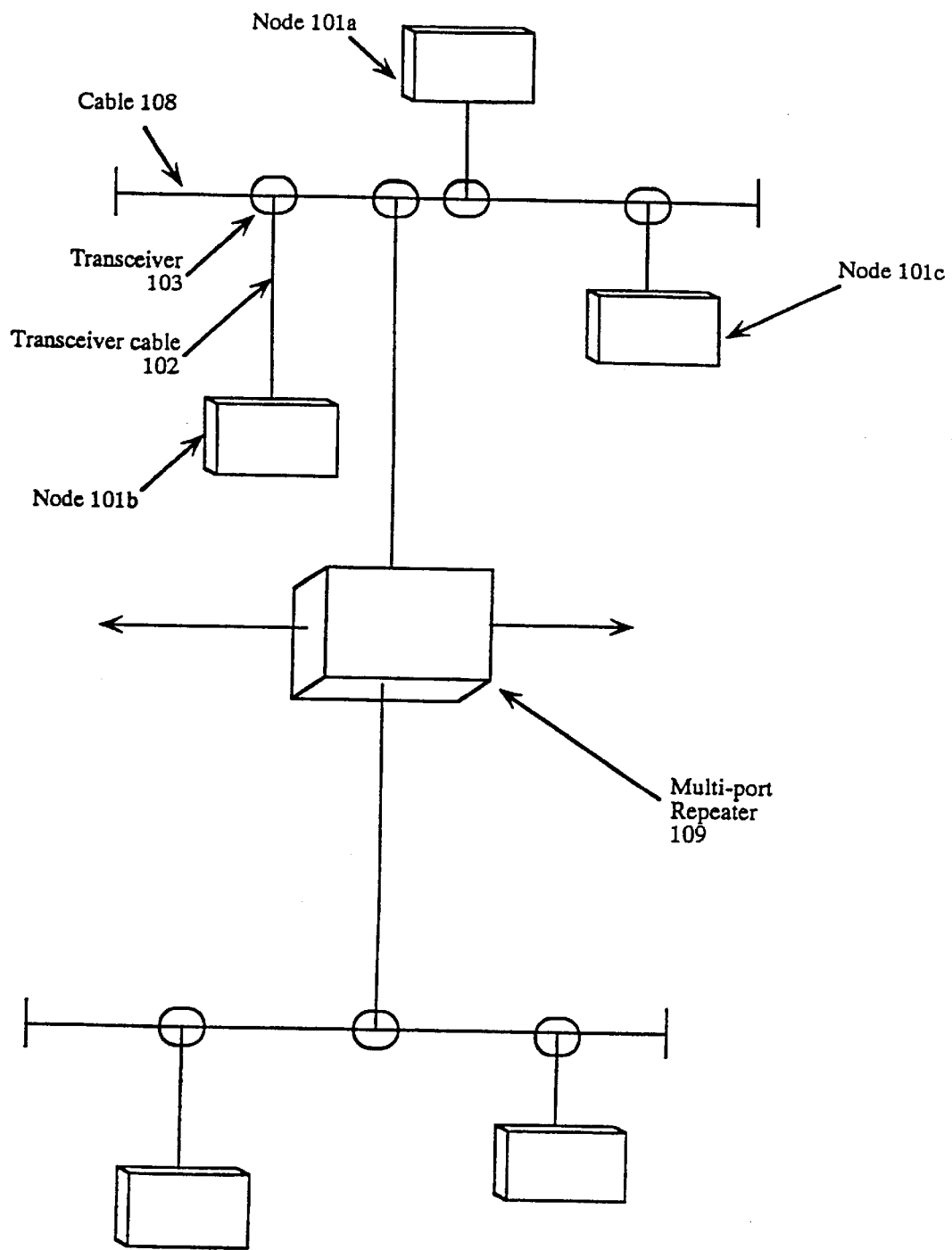
Figure 1(a) - Prior Art

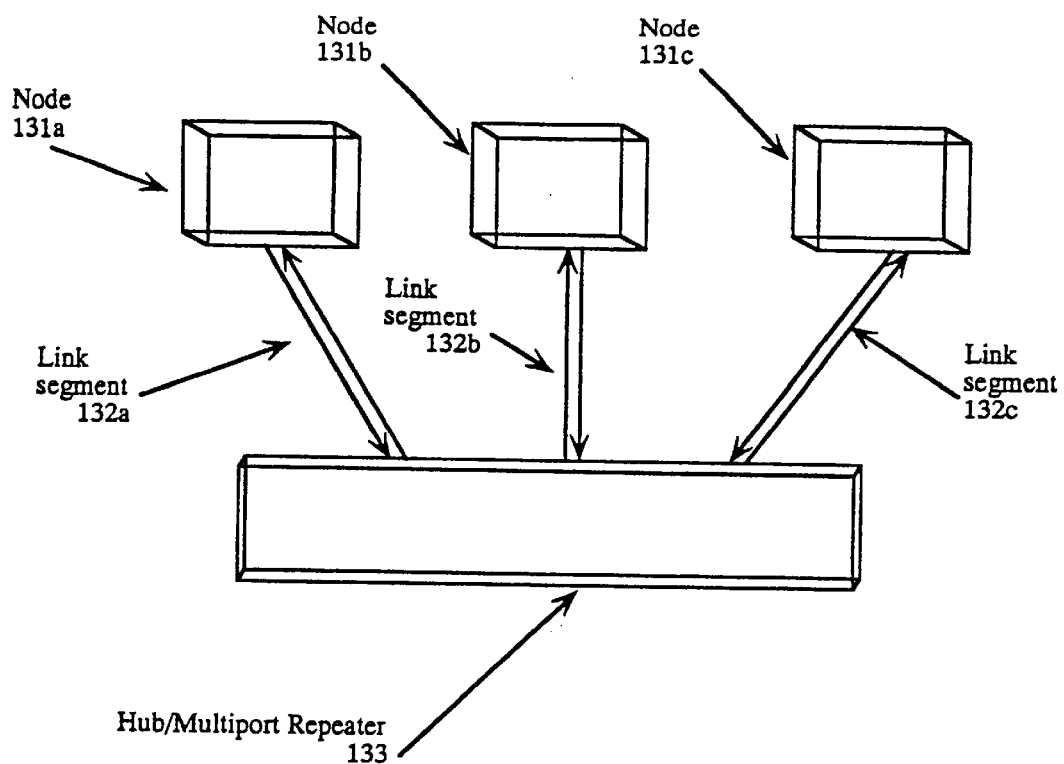
Figure 1(b) - Prior Art

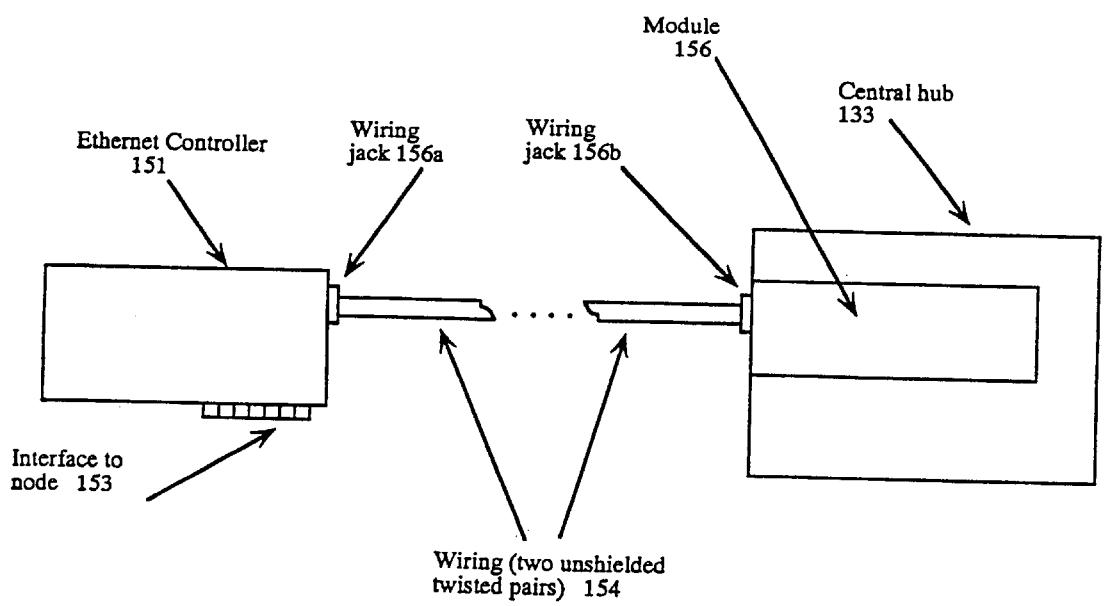
Figure 1(c) - Prior Art

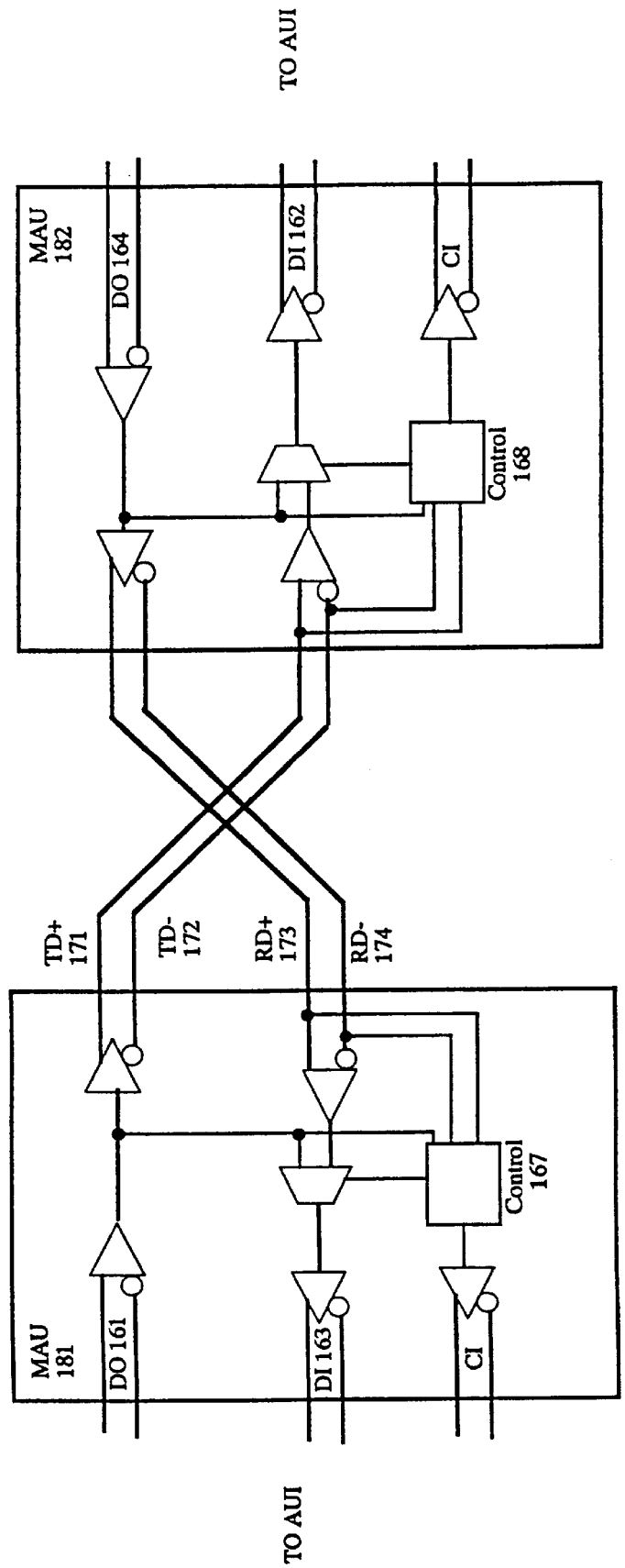
Figure 1(d) - Prior Art

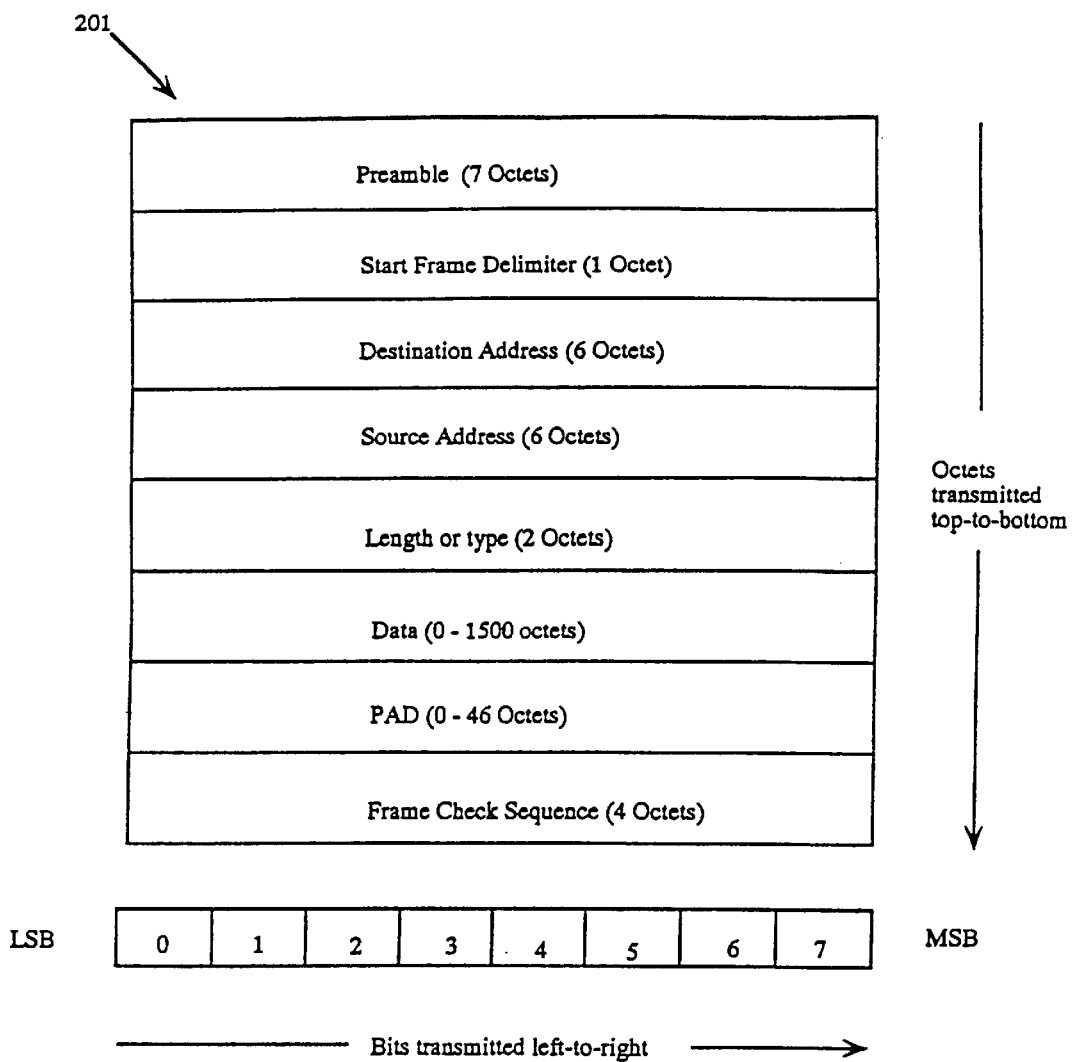
Figure 2 - Prior Art

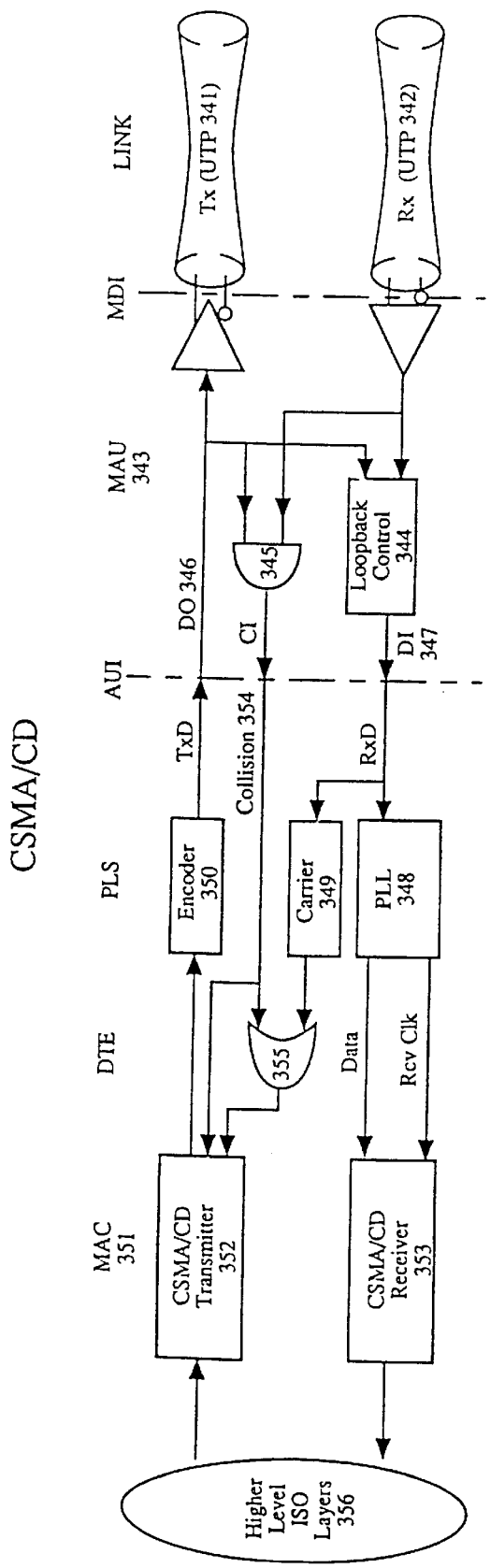
Figure 3(a) - Prior Art

METHOD AND APPARATUS FOR SWITCHING BETWEEN FULL-DUPLEX AND HALF-DUPLEX CSMA/CD SYSTEMS

BACKGROUND OF THE INVENTION

This application is a continuation-in-part of U.S. application Ser. No. 08/288,963, filed Aug. 10, 1994, U.S. Pat. No. 5,726,976.

FIELD OF THE INVENTION

The present invention relates to the field of computer network systems and, more specifically to carrier sense multiple access/collision detection (CSMA/CD) systems such as the well-known Ethernet-type networks.

DESCRIPTION OF THE RELATED ART

Computer Networks Generally

Computers have become commonplace in today's society and, with their increased numbers, there is ever increasing requirement to provide communication between them. This requirement is increasing not only due to the number of computers which are to be connected together (leading, for example, to significant issues in managing the networks and in providing physical communication media, i.e., cabling) but also to increases in the amount of information which is required to be communicated between the various nodes. As a result, a number of computer networking technologies have been developed and, often, standards have developed around these technologies.

Examples of these technologies include token ring networks in which a plurality of computers (or other devices such as file servers, networked modems, and the like—all of which will be referred to herein as devices) are connected in either a physical or logical ring and a token (a set of recognizable bits) is transmitted around the ring from device to device. When a device requires access to the ring to transmit information, it waits to receive the token and then holds the token while transmitting on the network. By holding onto the token, other devices are prevented from receiving the token while information is being transmitted and, in this way, collisions of transmitted data on the ring are prevented. Token ring systems are further described by Thomas W. Madron, *LANS Applications of IEEE/ANSI 802 Standards,* John Wiley & Sons, Inc., 1989 (hereinafter, *Madron*) and IEEE Standards 802.5, 1985 & 1990, provides standards for operation and implementation of token ring networks. At present, token ring systems generally provide for transmission rates on the ring of 4 to 16 Mb/s (megabits per second).

Another technology that provides for higher transmission rates is FDDI (or Fiber Distributed Data Interface). FDDI provides for transmission rates of 100 Mb/s on a ring. FDDI is also a token ring system which manages contention through passing of a token around a physical or logical ring. FDDI systems are further described by Madron and ASC X3T12 provides standards for operation and implementation of FDDI networks. Operating at 100 Mb/s obviously offers speed advantages over lower speed shared media.

Each of the above discussed networks are examples of what is termed "shared media" networks in which a number of devices act to share a common media for purposes of communication of information between the devices. Such networks generally provide for some type of contention management, such as the described token passing technique.

Another technology in the computer networking area is asynchronous transfer mode (ATM) networks which provide for a number of distributed switches for switching of cells or packets of information between devices. ATM networks are an example of a non-shared media network and as such collision prevention, collision detection and token passing techniques are unnecessary. ATM systems are further described by, for example, de Prycher, M., *Asynchronous Transfer Mode solution for broadband ISDN,* published by Ellis Horwood Limited, West Sussex, England, 1991. The International Telecommunications Union—Telecommunications Sector (ITC-T), formally CCITT, is one of several standards organizations that provide standards for operation and implementation of ATM networks.

CSMA/CD Networks

Finally, carrier sense multiple access (CSMA) networks are also well known. CSMA networks are generally thought of as being another example of shared media networks. This will be discussed in greater detail below. The present invention is primarily concerned with CSMA networks.

A device communicating over this type of network senses or listens to the communication media to determine if there are any messages being transmitted on the media by another device before accessing the media for transmission itself. If two devices transmit simultaneously on shared media, there will be a collision on the communication media. Therefore, devices in CSMA networks need to be capable of detecting such collisions (i.e., collision detection or CD). Thus, the acronym CSMA/CD. IEEE standard 802.3 describes CSMA/CD protocols for local area networks. CSMA/CD networks are described in greater detail with reference to, for example, Madron.

One well known example of a CSMA/CD network is the commercially popular Ethernet network. In this specification, the terms Ethernet, CSMA/CD and IEEE 802.3 (or simply 802.3) will be used interchangeably except where it is noted that specific reference is being made to a particular one of these networks.

Generally, today's CSMA/CD networks operate at data transmission speeds of 10 Mb/s. However, there is currently a push to develop technology capable of increased speed CSMA/CD networks operating at, for example, 100 Mb/s. One of the challenges in achieving this goal is that, from a commercial viewpoint, it is highly desirable to retain compatibility and compliance with the existing cabling standards and software to the largest extent possible.

History of CSMA/CD

Some historical information on CSMA/CD networks is appropriate to aid in an understanding of the present invention. In this regard, reference is made to FIGS. 1(*a*), 1(*b*) and 1(*c*).

FIG. 1(*a*) illustrates an Ethernet network and, specifically, illustrates two network segments. Each network segment comprises a coaxial cable, e.g., cable 108, and a plurality of nodes or devices, e.g., 101*a*, 101*b* and 101*c*. Each node is coupled with the coaxial cable through a transceiver cable (such as transceiver cable 102) and a transceiver (such as transceiver 103). It is noted that in more recent network configurations, the transceiver is built directly into the node, or least into a network interface card embodied within the node. This avoids the need for the transceiver cable and allows coupling directly with the coaxial cable.

In addition, the network segments are illustrated as being coupled with a repeater module 109 which serves to allow communication between the various network segments. In particular, a multiport repeater 109 is illustrated which allows communication between multiple network segments (however, only two segments are fully illustrated). The repeater is coupled with each of the various coaxial cables of the segments through a transceiver and transceiver cable or, more recently, simply through a transceiver embodied in the repeater coupled directly with the coaxial cable.

Importantly, as can be readily seen, all devices coupled with the network share a common communication medium with other devices, i.e., the coaxial cable. A message originating from any one node is communicated to all of the other various devices coupled with the segment (i.e., with the coaxial cable) and, through use of the repeater, the message is also communicated to other devices coupled with other segments of the network. Thus, this network configuration provides for communication from one point to multiple other points over a shared media.

More recently networks have been developed which are implemented in a star configuration. This is illustrated with reference to FIG. 1(b) which illustrates a central hub 133 in which each of the various nodes 131a, 131b and 131c are coupled to the hub 133 through link segments 132a, 132b and 132c, respectively. Link segments 132a, 132b and 132c each have a transmit and a receive link as illustrated by the Figure. A number of such hubs may be connected together, for example, in either a distributed or hierarchical fashion, to form a larger, enterprise-wide network, thereby providing the capability of communication between nodes coupled to different hubs.

More detail of the coupling of a node to the central hub is illustrated with reference to FIG. 1(c). FIG. 1(c) illustrates an Ethernet controller network interface card 151 which is typically coupled with, for example, the motherboard of a node through interface 153. In addition, FIG. 1(c) illustrates the central hub 133 which includes a module 156 which allows for coupling with the controller card 151. It is noted that although the hub 133 is illustrated as being of a modular design, it is not necessary to adopt such a design. Each of the controller 151 and module 156 typically comprise a wiring jack, 156a and 156b, respectively. The jacks 156a and 156b allow coupling of wiring 154 between the controller 151 and module 156. Commonly, this wiring 154 comprises relatively inexpensive unshielded twisted pair (UTP) wiring, extra pairs of which are typically installed in most buildings to provide for expanded telephone communication. Wiring 154 may also be comprised of optical fibers of the kind specified in IEEE standard 802.3j, 10BASE-FL.

In any event, as is seen with reference to FIGS. 1(b) and 1(c), the hub configuration provides for point-to-point communication between the nodes. Unlike the coaxial medium 108 shown in FIG. 1(a), the communication medium 154 is not shared with other devices in the network, although signals on this medium are transmitted to other devices.

Manchester Encoding

As has been stated, it is desired to increase the speed of a CSMA/CD network from the current 10 Mb/s to higher speeds, such as 100 Mb/s.

It is noted that, in this specification, reference is made to transmission speeds of, for example, 10 Mb/s and 100 Mb/s. This refers to the transmission speed of bits of information over the communication medium as distinguished from (1) the effective transmission rate of application level data from an application program running on one node to an application program running on another node, or from (2) the baud rate, which is also referred to as the line transition rate, which may be higher or lower than the bit transmission rate. In the case of application level communication, various overhead and other factors, including, for example, transmission errors and congestion, cause lower effective bit transmission rates than the transmission rates actually achieved on the medium.

10 Mb/s Ethernet systems utilize Manchester encoding on the communication medium. Use of Manchester encoding effectively requires a baud rate of two times the desired bit transmission rate. Therefore, to achieve a bit transmission rate of 10 Mb/s in a typical Ethernet system utilizing Manchester encoding, a baud of 20 Mbaud is required. Further information on Manchester encoding techniques is available with reference to Madron at pages 60–63.

Therefore, it is understood that, if it was desired to increase the speed of bit transmission in a CSMA/CD network by simply increasing the baud rate on the communication medium while continuing to utilize conventional Manchester encoding techniques, the baud rate of conventional Ethernet communication media must be increased from 20 Mbaud to 200 Mbaud in order to achieve the desired 100 Mb/s transmission rate. Order of magnitude increases in the baud rate of conventional Ethernet communication media likely will lead to numerous issues including, for example, an increase of RF emissions with respect to regulatory limits.

Thus, as will be discussed below, a new transmission technique has been developed which allows for an increased data rate on the communication medium without requiring an correspondingly equal percentage increase in the line transition rate (i.e., baud rate).

Inactive Nodes and Collision Detection

As has been discussed, Ethernet networks are designed around the concept that a node which wishes to transmit on the network first senses the shared communication medium to determine if it is idle. After having determined the medium is idle, the node may transmit. If two nodes transmit relatively simultaneously, a collision of the information transmitted by both nodes occurs. In such an event, each node continues to transmit a sequence of additional bits called a jam until such time as the collision has propagated to the ends of the network, thus ensuring all nodes in the network are aware a collision has occurred. Each node involved in the collision then waits a random period of time before attempting to again transmit, in an effort to avoid another collision, according to what is referred to by those skilled in the art as a "backoff and retransmission" algorithm.

It should be noted that a collision occurs only during the initial transmission of information from a node until such time as the transmission has propagated to all other nodes in the network. This period of time is referred to as the collision window. Once the transmission of information from a node has propagated to all other nodes in the network, i.e., once the collision window has passed, all the other nodes will have sensed the transmission and thereafter yield from transmitting until the communication medium is again idle. The transmitting node definitively acquires the communication medium after a period of time equal to the round trip propagation time of the communication medium has expired since the beginning of its own transmission of information.

As a result of this design, nodes which do not have messages to transmit ("inactive nodes") do not transmit on the medium, although they continue to monitor the medium for packets to be read. When a device starts to transmit, data packets start with a preamble to allow the various other nodes on the network to acquire and generate receive clock signals which are in phase with the incoming packet. By synchronizing clocks, data may be properly decoded when received.

Packet Format

The 802.3 standard specifies a format of a frame or "packet structure" 201 for data packets which is more fully described with reference to FIG. 2. This packet structure 201 is also referred to as the MAC packet structure because it is defined by IEEE 802.3 as part of the Media Access Control (MAC) sublayer derived from the OSI reference model.

The OSI reference model is a 7 layer conceptual model for networking systems which is well documented in the art. The Data Link layer is often discussed as having two sublayers—the MAC or media access control sublayer and LLC or logical link control sublayer. Reference is made to Madron at pages 15–45 for further information on the OSI model. The present invention is primarily concerned with the Physical layer and the MAC sublayer of the Data Link layer of the OSI model.

The MAC packet structure as defined by the 802.3 standards includes substantial overhead. For example, the packet structure 201 includes a 7 octet (56 bit) preamble that, as has been mentioned, is provided for clocking synchronization between a transmitting node and the receiving nodes. The packet structure 201 further includes a 1 octet (8 bit) start frame delimiter (SFD) that indicates the start of frame. The minimum packet size is 72 octets (the maximum is 1526 octets); therefore it can be seen that the preamble and SFD can constitute as much as over 11 percent of the total packet size (8 octets out of 72). The preamble and SFD information must be transmitted with every packet, thus requiring 8 octets (64) bits of overhead to be associated with each packet.

Thus, the packet structure, including for example, the overhead of the preamble and the SFD, has a significant impact on the actual effective transmission rate of application level data from an application program running on one node to an application program running on another node. In addition, significant changes to the packet structure to improve the actual effective transmission rate of data would most likely require changes to the MAC sublayer defined by IEEE 802.3. Thus, as will be discussed below, an improvement in the method of data transmission that does not change the packet structure or further increase the overhead associated with transmitting data is needed.

Half-Duplex Transmissions/Monitoring of Carrier Sense

The IEEE has developed standards for use of twisted pair cabling in 802.3 networks. The standards provide for coupling of two devices (e.g., two data terminals or a data terminal and a repeater) over a twisted pair link comprising two sets of twisted pair wires. The twisted pair cabling terminates at a medium attachment unit (MAU) on each of the two devices. For example, as mentioned above in connection with reference to FIG. 1(c), Ethernet controller 151 may be coupled with central hub 133 over unshielded twisted pair wiring 154.

It is noted that, with reference to the OSI model, the Physical Layer is comprised of the Physical Media Access (PMA) and the Physical Layer Signaling (PLS) sublayer. The PMA is embedded in the MAU. The Physical Layer Signaling (PLS) sublayer provides for physical and logical coupling between the MAU and the Data Link Layer and, optionally, an Attachment Unit Interface (AUI) which provides for coupling between the MAU and the PLS.

Further detail of this coupling is provided with reference to FIG. 1(d) which logically illustrates aspects of the medium attachment units, 181 and 182, of each of the two devices. The Figure further illustrates coupling of the MAU with the AUI through differential pairs DO, DI, and CI.

Reference is first made to MAU 181, and specifically, to transmitting data onto the twisted pair link through MAU 181. The MAU 181 receives signals for transmission on DO 161 from the AUI and proceeds to transmits these signals onto the twisted pair medium over differential pair 171 and 172. A positive signal is transmitted with line 171 being positive relative to the signal on line 172. A loopback function is provided within the MAU whereby the signal on DO 161 is provided back on the input DI 163 of the MAU under control of a controller 167. Controller 167 controls selection of signals for transmission on DI 163. Controller 167 selects either to loopback the signal on DO 161 when data is being transmitted on differential pair 171 and 172 or selects data from receive differential pair 173 and 174. For this purpose, data on receive differential pair 173 and 174 is monitored by controller 167. A collision is detected where there is a simultaneous occurrence of activity on DO 161 and of input data on the receive differential pair 173 and 174.

When not transmitting data received on DO 161, MAU 181 controls output differential pair 171 and 172 to transmit an active idle signal. Likewise, when data is not being received on input differential pair 173 and 174, the circuit expects to receive an active idle signal on this differential pair to assure that the connection with MAU 182 has been maintained.

Thus, it can be seen that the design of twisted pair 802.3 networking systems (often termed 10BASE-T or 802.3i) effectively allows for only half-duplex communication over the twisted pair link segment. During periods of transmission by a MAU, the receive lines are monitored for the existence of a carrier signal. If carrier is received during transmission it is interpreted as a collision on the link.

In addition to the constraints imposed by the 802.3 standard, traditional commercial embodiments of the Ethernet controller cards and transceivers often share some internal hardware within the MAC, such as FIFO buffers and CRC generators/checkers, between the input and output paths. This, of course, further restricts these devices to half-duplex transmission.

Full-Duplex Transmissions with Collision Detection Disabled

A recent modification applicable to existing 10BASE-T (and 10BASE-FL) standards provides for a communication system which allows for full-duplex transmission between devices in the network, thereby increasing maximum data transmission speeds from 10 Mb/s to 20 Mb/s. This extension to the standards is a viable, less expensive alternative to faster, yet still emerging technologies such as 100 Mb/s CSMA/CD or 155 Mb/s ATM networks. Full-duplex transmission, as opposed to half-duplex transmission, allows for simultaneous transmission of data in both directions across the communication media between two nodes connected point-to-point, as is seen, for example, with reference to FIGS. 1(b) and 1(c).

For full-duplex transmission, it is necessary to disable the loopback and collision detection functions within a MAU. For example, with reference to FIG. 1(d), the loopback function provided within MAU 181 whereby the signal on DO 161 is provided back on input DI 163 of the MAU under control of controller 167 is disabled. Controller 167 is also disabled such that it cannot detect a simultaneous occurrence of activity on DO 161 and of input data on the receive differential pair 173 and 174, indicating a collision has occurred. Disabling the loopback and collision detection functions has the effect of separating the transmit and receive circuitry of the MAU such that activity on the transmit differential pair 171 and 172 occurs without regard to activity on the receive differential pair 173 and 174, and vise versa, thereby enabling simultaneous transmission and reception of data through MAU 181. As will be demonstrated below, the disabling of the loopback and collision detection functions can be accomplished in a number of ways.

Simultaneous activity is possible in a 10BASE-T or 10BASE-FL environment because there is, necessarily, only one device at each end of a point-to-point link. As was discussed above in connection with FIGS. 1(b) and 1(c), the communication medium is not shared with other devices in the network. Thus, collisions are not an issue as they are in the case of the network illustrated in FIG. 1(a) wherein each network segment comprises a shared coaxial cable.

Backward Compatibility of Full-duplex Devices with Half-Duplex Devices

As full-duplex communication of data is incorporated into existing 802.3 networks, for example, a 10BASE-T network, backward compatibility needs to exist between newly installed devices supporting full-duplex communication of data and existing devices supporting only half-duplex communication of data, to allow for a smooth migration from half-duplex communication to full-duplex communication of data. Thus, the newly added devices should be capable of communicating data either in full-duplex or half-duplex mode. To that end, a number of methods have been employed for a node to switch between half-duplex communication and full-duplex communication, each with their own disadvantages and advantages.

Recall from the above discussion that the essential requirements for a device to provide full-duplex communication of data calls for a full duplex physical layer (i.e., link segment) disabling the loopback and collision detection circuitry located therein. Thus, generally any method of switching a device between half-duplex to full-duplex communication of data will involve disabling or enabling the loopback and collision detection circuitry of the MAU coupled thereto. The remaining issue, to which the present invention is directed, is the method by which the disabling and enabling of the loopback and collision detection circuitry occurs.

Prior art methods of switching between half- and full-duplex mode, as disclosed in International Patent Application PCT/US93/09864 (International Publication Number WO 94/09581, U.S. patent application Ser. No. 07/961,184, abandoned) include 1) manually operated hardware switches of a MAU, 2) software-controlled switches of a MAU responsive to control signals wherein the control signals are generated by software commands from a node in which the MAU is installed, 3) circuitry located in a node or a MAU attached thereto capable of sending a signal onto the network in accordance with the CSMA/CD protocol indicating the node is capable of full-duplex operation, and additional circuitry located in the node or MAU attached thereto capable of responding to an acknowledgment signal received from the network to enable or disable the loopback and collision detection circuitry.

A further prior art method of switching between half- and full-duplex mode, as disclosed in Draft Supplement to IEEE Std 802.3 100BASE-T, *MAC Parameters, Physical Layer, Medium Attachment Units and Repeater for 100 Mb/s Operation*, P802.3u/D2, July, 1994, involves what is referred to as physical layer link signaling for auto-negotiation on twisted-pair, or simply, auto-negotiation. Auto-negotiation provides the ability for a device to advertise and request modes of operation of which it is capable to a device at the other end of a point-to-point link as well as receive and acknowledge information regarding modes of operation of which the other device is capable, such that the devices determine the modes of operation supported by each and optimally operate according to those modes shared by both devices. Auto-negotiation is performed out of band using a modified 10BASE-T link integrity test pulse sequence (also known as "fast link pulse" or "FLP") to pass information which identifies the operational modes supported by a device, including, for example, full-duplex communication. This method is described in much greater detail with reference to the aforementioned IEEE Draft Supplement P802.3u/D2 and subsequent drafts.

As will be seen, the present invention provides for effective switching between half-duplex and full-duplex communication of data without the need for any additional hardware switches, software switches or signaling beyond that required for full-duplex communication, or modifications to existing signals required as part of the IEEE 802.3 standard.

SUMMARY OF THE INVENTION

The present invention provides a method and apparatus for a node to automatically switch between half-duplex and full-duplex transmission in CSMA/CD networks.

The present invention is characterized by a first and second device coupled over a communication link, such as two pairs of twisted pair wires to allow separate communication of information and control signals in each direction between the first and second device. Each of the two devices include a transmit circuit and a receive circuit.

The present invention further provides a method for transmitting information in a network wherein a first device begins to transmit information on a first communication circuit, the first communication circuit providing for communication of information between the first device and a second device, and the second device receives the transmitted information. If, while the first device is transmitting information to the second device, the second device transmits information (i.e., a packet of legal length according to the protocol) on a second communication circuit, the second communication circuit providing for communication of information between the second device and the first device, and the first device receives the transmitted information, full-duplex communication therebetween is established. If, while the first device is transmitting information to the second device, the second device transmits a jam packet, i.e., a packet of collision event length according to the protocol, and the first device receives such a packet, half-duplex communication therebetween is subsequently established.

These and other aspects of the present invention will be described in greater detail with reference to the Detailed Description and the accompanying Figures.

BRIEF DESCRIPTION OF THE DRAWINGS

FIG. 1(a) illustrates a known CSMA/CD communication network including two network segments utilizing a coaxial cable.

FIG. 1(b) illustrates a CSMA/CD communication network organized around a central hub utilizing link segments comprising unshielded twisted pair or fiber cabling.

FIG. 1(c) illustrates an Ethernet controller card coupled with a central hub over a twisted pair wire connection.

FIG. 1(d) illustrates further detail of the coupling of FIG. 1(c).

FIG. 2 illustrates a prior art packet and frame format.

FIG. 3(a) illustrates a prior art CSMA/CD interface as may be implemented by the present invention.

Figure 3B:
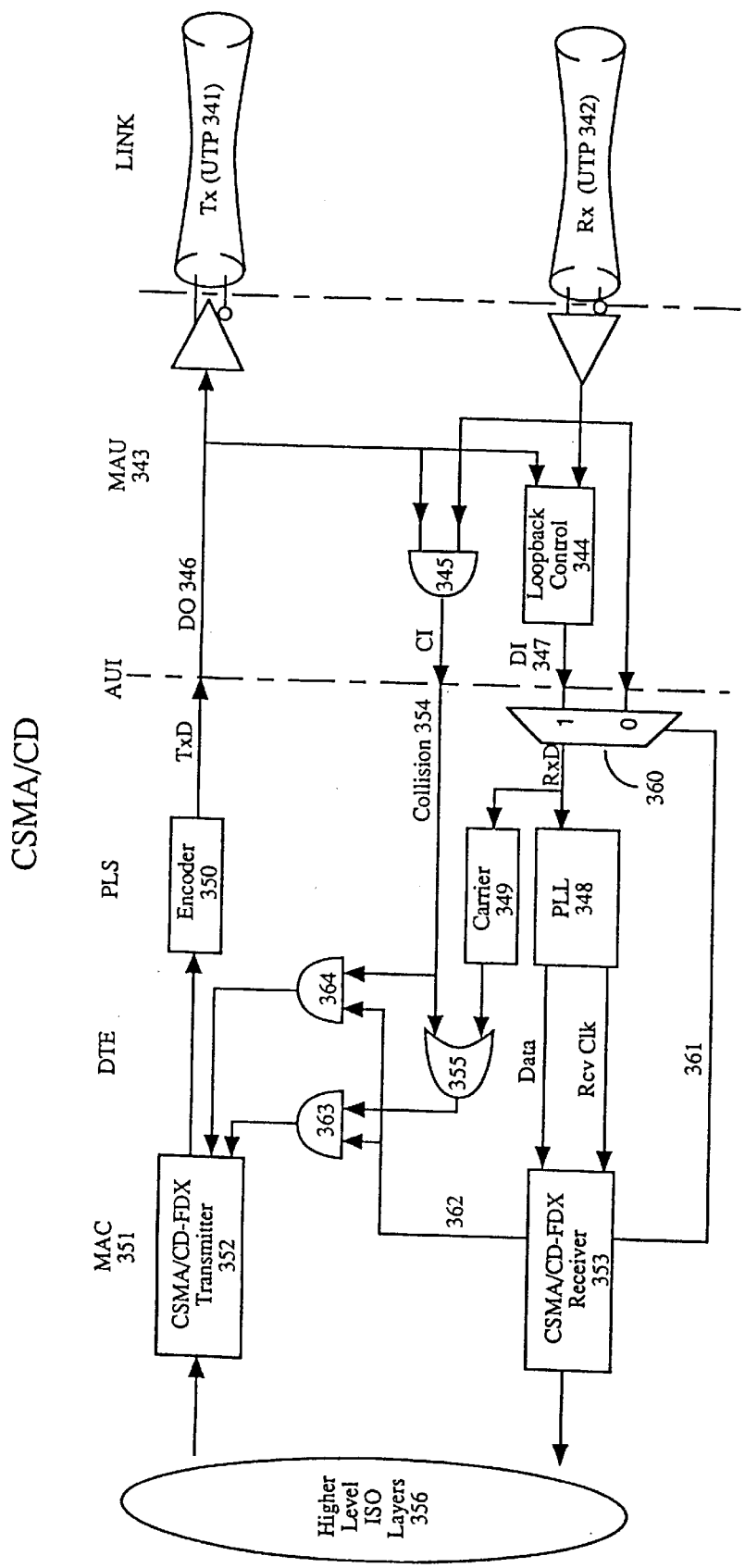
FIG. 3(b) illustrates a CSMA/CD interface capable of either full- or half-duplex communication as may be implemented by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 2, reference numerals may be numbered 2xx. In certain cases, a reference numeral may be introduced on one drawing and the same reference numeral may be utilized on other drawings to refer to the same item.

DETAILED DESCRIPTION OF THE PREFERRED EMBODIMENT

What is described herein is a method and apparatus for a node to automatically switch between half-duplex and full-duplex transmission in CSMA/CD networks. In the following description, numerous specific details are set forth in order to provide a thorough understanding of the present invention. It will be obvious, however, to one of ordinary skill in the art that the present invention may be practiced without these specific details. In other instances, well-known circuits, structures and techniques have not been shown in detail in order not to unnecessarily obscure the present invention.

Overview

In existing 802.3 networks when a device on the point-to-point link is transmitting data on its transmit link and simultaneously receives data (not the idle signal) on its receive link, the device recognizes the event as a collision. Thus, although the point-to-point link provides for simultaneous bidirectional communication between the two devices, effectively, this communication is limited to one-way communication of data. A recent modification to 802.3 networks involves disabling the loopback and collision detection functions of a MAU, thereby enabling two-way communication of data. The present invention provides for effective switching between half-duplex (one-way) and full-duplex (two-way) communication of data, thereby taking advantage of full-duplex communication of data while at the same time providing backward compatibility with devices capable of only half-duplex communication of data.

Prior Art CSMA/CD System

FIG. 3(a) illustrates a network interface of a prior art CSMA/CD system. It is useful to provide a brief overview of such a prior art interface in order to assist in developing an appreciation of the similarities and differences between such a prior art interface and the interface proposed by the preferred embodiment of the present invention.

The prior art device communicates over a link such as the illustrated unshielded twisted pair (UTP) link. This UTP link comprises two unshielded twisted pairs of wires, 341 and 342. These UTPs 341 and 342 couple with MAU 343 of the prior art device and, in particular, the first UTP pair 341 couples with Data Out circuit 346 and the second pair 342 is coupled in communication with Data In circuit 347. Pair 342 is coupled in communication with the Data In circuit 347 through loopback control circuit 344. In addition, Data Out circuit 346 is provided as a second input to loopback control circuit 344.

Data In circuit 347 is also provided to carrier sense circuit 349. Carrier sense circuit 349 provides as an output a signal indicating whether a carrier signal is present on circuit 347. This output is coupled as an input to OR gate 355.

Data out circuit 346 and Data In circuit 347 are both provided as inputs to AND gate 345. If transmission is detected on both circuit 346 and 347, a collision condition is signaled on collision detection line 354. Collision detection line 354, as well as the output of carrier sense circuit 349, are provided as inputs to OR gate 355. The output of OR gate 355 is provided as a control input to CSMA/CD transmitter 352 of the MAC interface 351. The output of AND gate 345 is also provided as a control input to transmitter 352.

The Data In circuit 347 is further provided as an input to phase locked loop circuit 348 which provides, as its outputs, both a data signal and a receive clock signal to CSMA/CD receiver 353. CSMA/CD receiver 353 interfaces as input to higher lever ISO layers 356.

The higher level ISO layers 356 also interface by providing information to CSMA/CD transmitter 352. Assuming carrier is sensed on the receive line (through carrier sense circuit 349) and no collision is sensed, CSMA/CD transmitter is controlled to provide output data to encoder 350 which is then provided on Data Out circuit 346.

All of the above is well known in the art and is provided here simply as background. Further description is available from any of a number of sources. Importantly, it can be seen and appreciated that CSMA/CD transmitter 352 may be controlled to transmit only when carrier is sensed and a collision is not detected. Therefore, by definition, the interface may only transmit or receive at any given time and the interface does not, therefore, provide a full-duplex interface.

CSMA/CD-FDX Network Interface of the Present Invention

FIG. 3(b) illustrates the network interface of a device as may be implemented by the present invention. The logic diagram illustrated in FIG. 3(b) demonstrates, and is not limited to, one way in which a device and its associated MAU may switch from half-duplex to full-duplex communication of data, or vise versa. As can be seen, similar to the prior art interface described above in FIG. 3(a), the interface of the present invention is designed to interface with a communications link such as the illustrated unshielded twisted pair interface which comprises the two unshielded twisted pairs (UTP) of wires 341 and 342. However, as has been mentioned, the present invention provides for full-duplex communication over the link.

As was discussed earlier, full-duplex communication is achieved by disabling the loopback and collision detection circuitry. This can be accomplished, for example, by way of multiplexor 360 and AND gates 363 and 364. When CSMA/CD-full duplex receiver 353, hereinafter referred to as CSMA/CD-FDX receiver 353, asserts the signals communicated over lines 361 and 362, loopback control circuit 344, carrier sense circuit 349, and collision detect line 354 are enabled, and thus, the MAU operates in half-duplex mode, that is, if data is transmitted over UTP 341 while at the same time data is received over UTP 342, a collision will occur. However, when CSMA/CD-FDX receiver 353 deasserts the signals communicated over lines 361 and 362, loopback control circuit 344, carrier sense circuit 349, and collision detection line 354 are disabled. Control logic present in CSMA/CD-FDX receiver 353 controls the assertion and deassertion of the signals transmitted over lines 361 and 362 to enable or disable the loopback control and collision detect circuitry, thereby controlling switching between half-duplex and full-duplex communication.

Figure 3C:
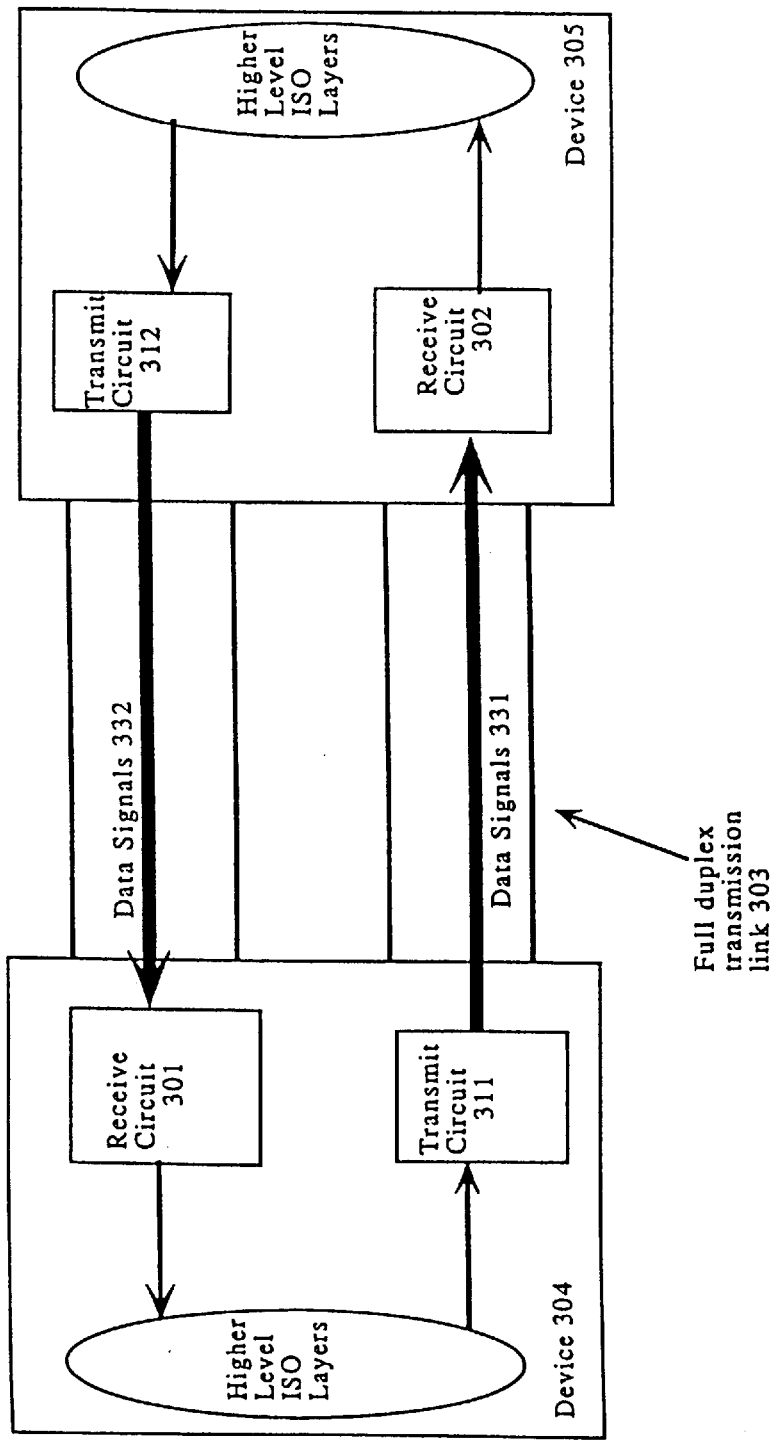
FIG. 3(c) illustrates a CSMA/CD network, including a block diagram illustration of interfaces at two sides of a transmission link, as may be implemented by the present invention.

FIG. 3(c) illustrates, conceptually, two devices, 304 and 305, coupled over a point-to-point communications link in which the collision detection and loopback circuitry has been disabled by way of the circuitry discussed in FIG. 3(b), namely, AND gates 363 and 364, multiplexor 360, lines 361 and 362, and control logic in CSMA/CD-FDX receiver 353. The devices 304 and 305 may comprise, for example, computer workstations, printers, file servers, switching hubs, or other devices. For example, device 304 may be one of the nodes 131a–131c illustrated by FIG. 1(b), while device 305 may represent one connection of the central hub 133.

Each of devices 304 and 305 comprise a receive circuit 301 and 302, respectively, and a transmit circuit 311 and 312, respectively. Receive circuits 301 and 302 and transmit circuits 311 and 312 are coupled with a full-duplex communications link 303, which may correspond to one of link segments 132a–132c. In the preferred system, this link 303 may comprise two pairs of twisted pair wiring coupled as in a cross-connected configuration as was described with reference to FIG. 1(*d*). However, other types of full duplex physical communications medium may also be utilized, for example, shielded twisted pair wiring, and fiber optics cabling.

In any event, as can be seen with reference to FIG. 3(*c*), transmit circuit 312 of device 305 is coupled to communicate information to receive circuit 301 of device 304 and transmit circuit 311 of device 304 is coupled to communicate information to receive circuit 302 of device 305. Each of transmit circuits 311 and 312 and receive circuits 301 and 302 are coupled to interface with higher ISO levels executing on their respective devices 304 and 305.

Link segment 303 is logically illustrated as providing for simultaneous bidirectional transmission of data signals 331 from device 304 through transmit circuit 311 to device 305 through receive circuit 302 and data signals 332 from device 305 through transmit circuit 312 to device 304 through receive circuit 301.

Standards/OSI Changes

It is important to note that the present invention may be implemented by changes to the OSI MAC sublayer and does not require changes to hardware and/or software implementing higher OSI levels. Thus, the present invention may be implemented with minimal changes to existing hardware and software while providing for significant performance enhancements. Thus, the higher level hardware and software may be used in systems operating according to the present invention or in system implementing conventional technology.

Method of Switching between Full-Duplex and Half-Duplex of the Present Invention As discussed above, as full-duplex communication of data is incorporated into existing 802.3 networks, backward compatibility needs to exist between newly installed devices having MAUs supporting full-duplex communication of data and existing devices whose MAUs support only half-duplex communication of data, to allow for a smooth migration from half-duplex communication to full-duplex communication of data. Thus, the newly added devices should be capable of communicating data either in full-duplex or half-duplex mode. To that end, a number of methods have been employed for a node to switch between half-duplex communication and full-duplex communication, that is, to enable or disable the loopback and collision detection circuitry located therein. Thus, generally any method of switching a device between half-duplex to full-duplex communication of data will involve disabling or enabling the loopback and collision detection circuitry of the MAU coupled thereto. It is the method by which the disabling and enabling of the loopback and collision detection circuitry occurs to which the present invention is directed.

In the present invention, the method of switching between full-duplex and half-duplex communication is as follows. A device capable of full-duplex communication of data (the full-duplex device) initially powers up ready to perform full-duplex communication. Thus, with reference to FIG. 3(*b*), CSMA/CD-FDX receiver 353 of the full-duplex device initially deasserts the signals communicated over lines 361 and 362, loopback control circuit 344, carrier sense circuit 349, and collision detection line 354. In so doing, loopback control, collision detect and carrier sense circuitry is disabled, making full-duplex communication possible.

Whether, indeed, full-duplex communication is actually achieved by the full-duplex device depends on the capability of the other device on the other end of the point-to-point link segment. If the other device does not support full-duplex then full-duplex communication between the two devices will not be achieved.

If both devices support full-duplex communication, the process is as follows. Both devices default to full-duplex communication, for example, upon power-up. The CSMA/CD-FDX receiver 353 in each device has deasserted the signals communicated over lines 361 and 362, loopback control circuit 344, carrier sense circuit 349, and collision detection line 354. No other steps are required. Both devices may transmit and receive data simultaneously. Thus, full-duplex communication, that is, simultaneous bidirectional communication, between the two devices is achieved automatically.

If only one device supports full-duplex communication, the process is as follows. According to the method of the present invention, one device defaults to full-duplex communication of data on power-up. The CSMA/CD receiver in that device (the full-duplex device) has deasserted the signals communicated over lines 361 and 362, loopback control circuit 344, carrier sense circuit 349, and collision detection line 354. The other device (the half-duplex device), however, does not support full-duplex communication. Unlike the prior art methods discussed above, no negotiation or the like is attempted between the full-duplex device ready to communicate in full-duplex mode and the half-duplex device able to communicate only in half-duplex mode.

If not already completed, a connection is then established between the two devices, for example, as directed by peer upper layers of the OSI model on each device. Either device may first begin to transmit frames of data to the other device. For example, the full-duplex device may begin to transmit frames of data to the half-duplex device. The half-duplex device may then respond by transmitting frames of data to the full-duplex device.

Communication may continue in this manner for some period of time depending on the level and timing of traffic between the full-duplex and half-duplex device, with both devices unaware that the other is operating in a different mode until such time as the full-duplex device transmits a frame of data at the same time the half-duplex device transmits a frame of data, whereupon the half-duplex device collision detection circuitry detects simultaneous transmission and reception of data over UTP pairs 341 and 342, respectively. As is well known to one of ordinary skill in the art, CSMA/CD transmitter circuitry 352 in the half-duplex device then properly sends a jam signal and terminates transmission to notify the other device that a collision has occurred. The full-duplex device receives the collision fragment and recognizes on that basis that the half-duplex device is communicating in half-duplex mode, whereupon it switches to half-duplex communication. Specifically, a valid collision is detected by CSMA/CD-FDX receiver 353 of the full-duplex device. Control logic present in CSMA/CD-FDX receiver 353 of the full-duplex device then asserts the signals communicated over lines 361 and 362, thereby controlling switching from full-duplex to half-duplex communication. As a result, loopback control circuit 344, carrier sense circuit 349, and collision detect line 354 are enabled, and thus, the MAU of the full-duplex device now operates in half-duplex mode, that is, if data is transmitted over UTP 341 while at the same time data is received over UTP 342, a collision will occur. Thus, both devices now communicate in half-duplex.

CSMA/CD-FDX receiver 353 of the full-duplex device discerns the difference between a frame of data received from the half-duplex device and a collision on the basis of the size of the frame. For example, in a 10 Mb/s IEEE 802.3 CSMA/CD local area network, the minimum frame size of a valid frame of data is 512 bits or 64 octets. As is well known to one of ordinary skill in the art, a collision, however, is less than 512 bits, (as governed by the slot time, which is based on the maximum round-trip propagational delay time, i.e., the time it takes for a signal to propagate from one end of the link segment and back, plus the size of the jam signal transmitted by the MAC layer upon detection of a collision, performed to notify other devices in the network that a collision has occurred). Thus, if CSMA/CD-FDX receiver 353 of the full-duplex device receives a frame of less than 512 bits while communicating in full-duplex mode, it recognizes it as a collision and, on that basis, switches the full-duplex device to half-duplex mode. If, however, the frame is greater than or equal to 512 bits, the frame is a valid frame of data, and, on that basis, the device remains in full-duplex mode.

Moreover, according to the IEEE 802.3 standard, a collision is not only less than 512 bits, but greater than or equal to 96 bits in length. Thus, CSMA/CD-FDX receiver 353 of the full-duplex device may further test for a frame size of less than 96 bits (the number of bit times required for interframe spacing). If a frame is less than 96 bits, it is considered a noise event, not a collision, in which case the full-duplex device remains in full-duplex mode. Thus, in summary, the test for a collision is if CSMA/CD-FDX receiver 353 of the full-duplex device detects a frame greater than or equal to approximately 96 bits but less than approximately 512 bits, the frame is considered a collision, in which case, the full-duplex device asserts the signals communicated over lines 361 and 362, thereby controlling switching from full-duplex to half-duplex communication. The values of 96 bits and 512 bits require slight adjustment for analog system losses.

Thus, what has been disclosed is a method and apparatus for a node to automatically switch between half-duplex and full-duplex transmission in CSMA/CD networks.

We claim:

1. A method for a first node coupled to a network for switching between a half-duplex and a full-duplex transmission of frames of data in said network, comprising:
   a) transmitting said frames of data from said first node in full-duplex mode on said network; and
   b) switching to transmitting said frames of data from said first node in half-duplex mode on said network if a collision transmitted from a second node coupled to said network is detected by said first node.

2. The method recited in claim 1 where said network is a local area network.

3. The method recited in claim 2 wherein said local area network is a CSMA/CD network.

4. The method recited in claim 3 wherein a collision detection circuit and a loopback circuit of a media attachment unit in said first node are disabled while said first node is transmitting said frames of data in full-duplex mode on said network, and said collision detection circuit and said loopback circuit of said media attachment unit in said first node are enabled while said first node is transmitting said frames of data in half-duplex mode on said network.

5. The method recited in claim 3 wherein said CSMA/CD network is a point-to-point network.

6. The method recited in claim 5 wherein a communication medium of said point-to-point network is twisted pair wires.

7. The method recited in claim 6 wherein said twisted pair wires comprises two sets of pairs of said twisted pair wires, a first set for providing communication from said first node to said second node and a second set for providing communication from said second node to said first node.

8. The method recited in claim 6 wherein said twisted pair wires is unshielded twisted pair wires.

9. The method recited in claim 5 wherein a communication medium of said point-to-point network is fiber optic cable.

10. A method for switching between a half-duplex transmission of data and a full-duplex transmission of said data between a first device and a second device coupled in a network comprising the steps of:
    a) transmitting said data on said network from said first device in full-duplex mode;
    b) transmitting a collision from said second device to said first device; and
    c) switching said first device to half-duplex transmission in response to step b.

11. The method recited in claim 10 wherein said data is transmitted in frames.

12. The method recited in claim 10 wherein said network is a local area network.

13. The method recited in claim 12 wherein said local area network is a point-to-point network.

14. A method for a node coupled to a network for switching from a full-duplex transmission of data on said network to a half-duplex transmission of data on said network comprising the steps of:
    a) initially transmitting data from said node on said network and receiving data at said node from said network in full-duplex mode; and
    b) transmitting data from said node on said network and receiving data at said node from said network in half-duplex mode if a collision on said network is detected by said node.

15. The method recited in claim 14 wherein said data is transmitted in frames.

16. The method recited in claim 14 wherein said network is a local area network.

17. The method recited in claim 16 wherein said local area network is a point-to-point network.

18. The method recited in claim 14 wherein said full-duplex transmission of said data generally occurs at a transmission rate of 20 megabits per second.

19. The method recited in claim 14 wherein said full-duplex transmission of said data generally occurs at a transmission rate of 200 megabits per second.

20. The method recited in claim 14 wherein said half-duplex transmission of said data generally occurs at a transmission rate of 10 megabits per second.

21. The method recited in claim 14 wherein said half-duplex transmission of said data generally occurs at a transmission rate of 100 megabits per second.

22. A method for a first node coupled to a network for switching from a full-duplex transmission of frames of data on said network to a half-duplex transmission of frames of data on said network comprising the steps of:
    a) initializing said first node to transmit and receive frames of data on said network in full-duplex mode;

b) transmitting frames of data from said first node on said network;

c) concurrently receiving at said first node frames of data transmitted by a second node coupled to said network; and d) switching said first node to transmitting and receiving frames of data on said network in half-duplex mode if a frame is received at said first node from said second node indicating a collision has been detected by said second node.

23. The method recited in claim 22 wherein step d) comprises the steps of:

a) continuing to transmit frames of data from said first node over said network and receive frames of data at said first node from said network in full-duplex if said frame received at said first node from said second node over said network is greater than or equal to a minimum valid frame size for a frame of data, and b) switching to transmitting frames of data from said first node over said network and receiving frames of data at said first node from said network in half-duplex if said frame received at said first node from said second node over said network is less than said minimum valid frame size for said frame of data.

24. The method recited in claim 22 wherein step d) comprises the steps of:

a) continuing to transmit frames of data from said first node to and receive frames of data at said first node from said network in full-duplex if said frame received from said second node over said network is greater than or equal to a minimum valid frame size for said frame of data;

b) continuing to transmit frames of data from said first node to and receive frames of data at said first node from said network in full-duplex if said frame received from said second node over said network is less than a minimum valid frame size for a collision; and c) switching said first node to transmit and receive said frames of data on said network in half-duplex if said frame received from said second node over said network is greater than or equal to said minimum valid frame size for said collision and less than said minimum valid frame size for said frames of data.

25. The method recited in claim 24 wherein step a) comprises the step of:

a) switching said first node to transmit and receive frames of data on said network in half-duplex if said frame received from said second node over said network is greater than or equal to said minimum valid frame size for said collision and less than said minimum valid frame size for said frame of data and does not include a valid cyclical redundancy check flag.

26. The method recited in claim 22 wherein said network is a local area network.

27. The method recited in claim 26 wherein said local area network is a point-to-point network.

* * * * *